United States Patent
Kamada

(10) Patent No.: US 9,540,981 B2
(45) Date of Patent: Jan. 10, 2017

(54) EXHAUST GAS PROCESSING DEVICE AND CONSTRUCTION MACHINE

(71) Applicant: KOBELCO CONSTRUCTION MACHINERY CO., LTD., Hiroshima-shi (JP)

(72) Inventor: Masashi Kamada, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/580,512

(22) Filed: Dec. 23, 2014

(65) Prior Publication Data
US 2015/0211401 A1    Jul. 30, 2015

(30) Foreign Application Priority Data
Jan. 24, 2014 (JP) .................... 2014-011520

(51) Int. Cl.
*F01N 13/00* (2010.01)
*F01N 3/20* (2006.01)
*F01N 3/24* (2006.01)

(52) U.S. Cl.
CPC ........... *F01N 3/208* (2013.01); *F01N 3/2046* (2013.01); *F01N 3/2066* (2013.01); *F01N 3/24* (2013.01);
(Continued)

(58) Field of Classification Search
CPC .......... F01N 2260/02; F01N 2260/024; F01N 2610/11; F01N 2610/1453; F01N 2610/1493; F02M 53/043
See application file for complete search history.

(56) References Cited

U.S. PATENT DOCUMENTS

| 2013/0081377 A1 | 4/2013 | Burger et al. |
| 2013/0118155 A1 | 5/2013 | Domon et al. |

(Continued)

FOREIGN PATENT DOCUMENTS

| DE | 10 2010 030 343 A1 | 12/2011 | |
| DE | 102010040003 A1 * | 3/2012 | ........... F01N 3/2066 |

(Continued)

OTHER PUBLICATIONS

Machine translation of DE 102010040003 A1, accessed on Mar. 2, 2016.*

(Continued)

*Primary Examiner* — Jonathan Matthias
(74) *Attorney, Agent, or Firm* — Oblon, McClelland, Maier & Neustadt, L.L.P.

(57) ABSTRACT

An exhaust gas processing device includes: an exhaust gas processing unit positioned above an engine; a reduction agent tank accommodating a reduction agent; a reduction agent supply unit attached to the exhaust gas processing unit; a cooling unit having a first end portion and a second end portion; a cooling water accommodation unit having a lower portion positioned below the cooling unit; a first pipe connecting the first end portion and the cooling water accommodation unit; a second pipe connecting the second end portion and the cooling water accommodation unit; a circulating device driven by the engine. The first pipe and the second pipe are connected to the lower portion. The first pipe includes: a connection portion connected to the first end portion; an apex portion positioned above the cooling unit; a supplying portion positioned between the connection portion and the apex portion. Thus, it is possible to suppress an increase in the temperature of the reduction agent supply unit.

16 Claims, 9 Drawing Sheets

(52) U.S. Cl.
CPC ...... *F01N 2260/024* (2013.01); *F01N 2590/08* (2013.01); *F01N 2610/11* (2013.01); *F01N 2610/1453* (2013.01); *F01N 2610/1493* (2013.01); *Y02T 10/24* (2013.01)

(56) References Cited

U.S. PATENT DOCUMENTS

| | | | |
|---|---|---|---|
| 2013/0145749 A1 | 6/2013 | Merchant et al. | |
| 2014/0290222 A1* | 10/2014 | Sawada | F01N 3/10 60/286 |
| 2015/0167527 A1* | 6/2015 | Morey | F01N 3/2046 60/274 |
| 2015/0198075 A1* | 7/2015 | Gong | F01N 3/2066 60/274 |

FOREIGN PATENT DOCUMENTS

| | | |
|---|---|---|
| JP | 9-96212 A | 4/1997 |
| JP | 2012-237232 | 12/2012 |

OTHER PUBLICATIONS

Extended European Search Report issued Jun. 3, 2015 in Patent Application No. 15150300.0.

\* cited by examiner

US 9,540,981 B2

EXHAUST GAS PROCESSING DEVICE AND CONSTRUCTION MACHINE

TECHNICAL FIELD

The present invention relates to an exhaust gas processing device provided in a construction machine having an engine so as to processing exhaust gas of the engine and also relates to a construction machine having the exhaust gas processing device.

BACKGROUND ART

Conventionally, a construction machine having an exhaust gas processing device is known. The exhaust gas processing device purifies nitrogen oxides in exhaust gas discharged from an engine. The exhaust gas processing device causes a reduction reaction of nitrogen oxides in the exhaust gas and a reduction agent to occur using a reduction catalyst, for example, to decompose the nitrogen oxides into water and nitrogen. The exhaust gas processing device includes a $NO_X$ purification device that is disposed on an engine and has a reduction catalyst therein, a urea water tank that accommodates urea water as a reduction agent to be supplied to the $NO_X$ purification device, and a urea water injection valve that is attached to the $NO_X$ purification device so as to inject the urea water in the urea water tank into the $NO_X$ purification device (for example, see Japanese Unexamined Patent Publication No. 2012-237232). In the exhaust gas processing device, the urea water injection valve injects urea water into the $NO_X$ purification device. Moreover, the exhaust gas processing device causes a reduction reaction between nitrogen oxides in the exhaust gas and an ammonia generated from the urea water by a reduction catalyst in the $NO_X$ purification device. In this way, the exhaust gas processing device purifies nitrogen oxides in the exhaust gas.

The urea water injection valve of the exhaust gas processing device, that is, the reduction agent supply unit, is attached to the $NO_X$ purification device through which hot exhaust gas passes. Due to this, the temperature of the reduction agent supply unit is likely to increase with the heat of the exhaust gas. When the temperature of the reduction agent supply unit increases, the temperature of the urea water passing through the reduction agent supply unit also increases. Due to this, in the exhaust gas processing device, an excessively large amount of ammonia may be generated due to hydrolysis of urea water. In such a case, after the exhaust gas processing device causes a reduction reaction of the nitrogen oxides and ammonia to occur in the $NO_X$ purification device, the ammonia may remain in the $NO_X$ purification device, as a result, the $NO_X$ purification device may corrode. Due to this, it is desirable to provide an exhaust gas processing device capable of suppressing an increase in the temperature of the reduction agent supply unit and a construction machine having the exhaust gas processing device.

SUMMARY OF INVENTION

An object of the present invention is to provide an exhaust gas processing device that is provided in a construction machine having an engine and that processes exhaust gas of the engine, the exhaust gas processing device including: an exhaust gas processing unit that is positioned above the engine so as to allow the exhaust gas of the engine to pass through the exhaust gas processing unit; a reduction agent tank that accommodates a reduction agent capable of reducing the exhaust gas; a reduction agent supply unit that is attached to the exhaust gas processing unit so as to supply the reduction agent accommodated in the reduction agent tank into the exhaust gas processing unit; a cooling unit that has a first end portion and a second end portion positioned on an opposite side to the first end portion, the cooling unit allowing cooling water to pass through the cooling unit and then allow the cooling water passing through the cooling unit to exchange heat with the reduction agent supply unit, thereby cooling the reduction agent supply unit; a cooling water accommodation unit that has a lower portion positioned below the cooling unit and accommodates cooling water to be supplied to the cooling unit; a first connection pipe that connects the first end portion of the cooling unit and the cooling water accommodation unit; a second connection pipe that connects the second end portion of the cooling unit and the cooling water accommodation unit; and a circulating device that is driven by the engine so as to cause the cooling water to circulate through the first connection pipe and the second connection pipe such that the cooling water accommodated in the cooling water accommodation unit flows into the cooling unit through one of the first end portion and the second end portion of the cooling unit and flows out of the cooling unit through the other one of the first end portion and the second end portion of the cooling unit, wherein the first connection pipe and the second connection pipe are connected to the lower portion of the cooling water accommodation unit, and the first connection pipe includes: a connection portion connected to the first end portion of the cooling unit; an apex portion positioned on an uppermost side of the first connection pipe and above the cooling unit; and a supplying portion positioned between the connection portion and the apex portion so that cooling water in the supplying portion can be supplied to the cooling unit in place of the cooling water boiled in the cooling unit when the engine is stopped.

DESCRIPTION OF EMBODIMENTS

Figure 1:
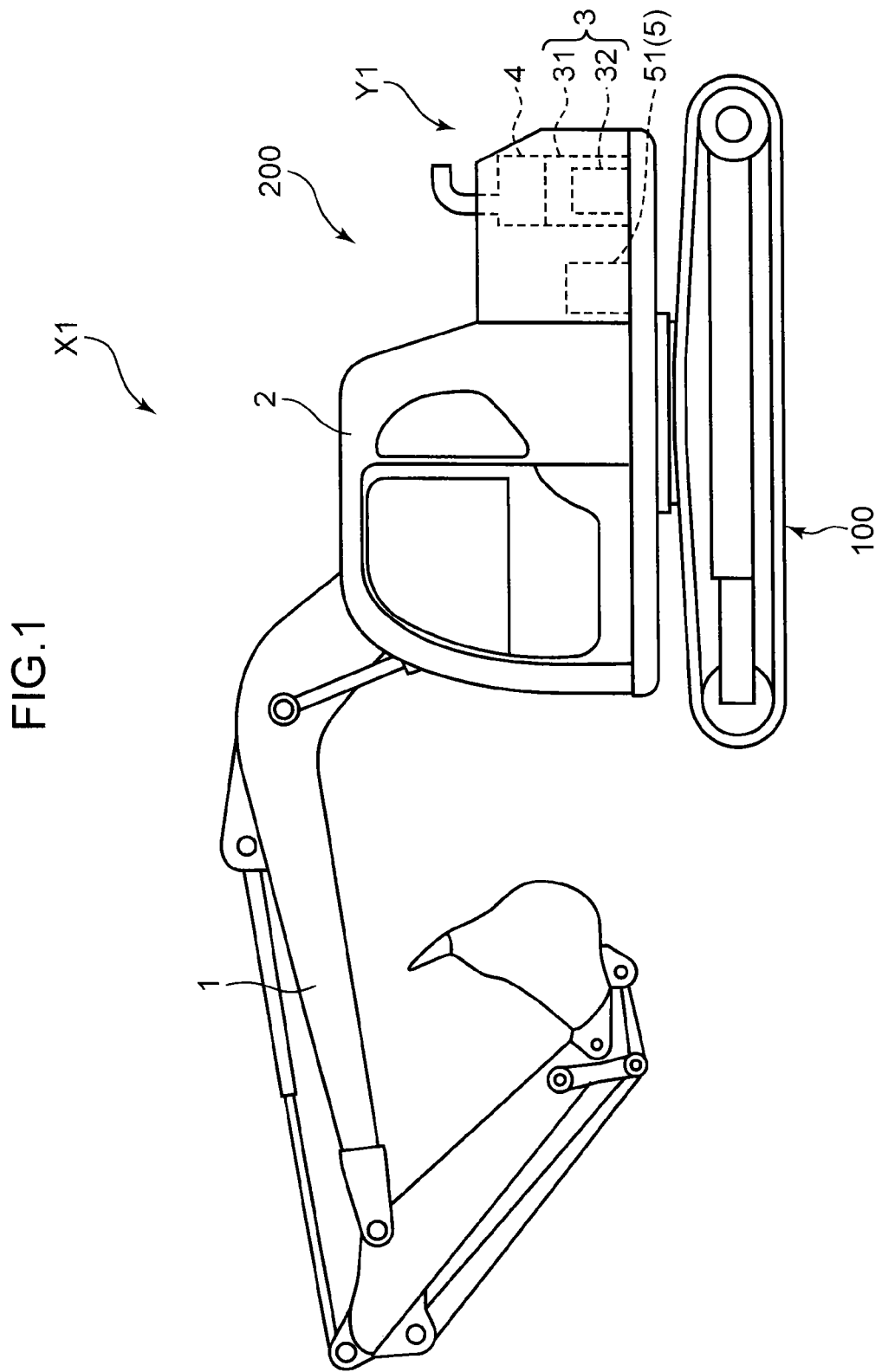
FIG. 1 is a side view illustrating a construction machine according to the present embodiment.

Hereinafter, an embodiment of the present invention will be described with reference to the drawings. The following embodiment is a specific example of the present invention and is not intended to limit the technical scope of the present invention.

Moreover, the respective drawings referred to below illustrates, in a simplified manner, main members required for describing the present invention among constituent members of the present embodiment. Thus, the exhaust gas processing device and the construction machine according to the present invention may have optional constituent members which are not illustrated in the drawings referred to in the present specification.

As illustrated in FIG. 1, a construction machine X1 includes a lower traveling body 100 and a upper swinging body 200 mounted on the lower traveling body 100 so as to be able to swing.

An attachment 1, a cab 2, an engine unit 3, and an exhaust gas processing device Y1 are mounted on the upper swinging body 200.

First, the attachment 1 and the cab 2 will be described with reference to FIG. 1.

The attachment 1 is a member for performing operations such as excavation. The attachment 1 is positioned on the front side in a front-rear direction of the upper swinging body 200. In the present embodiment, the attachment 1 includes a boom, an arm connected to a distal end of the boom, and a bucket connected to a distal end of the arm.

The cab 2 forms a control room in which an operator of the construction machine X1 controls the construction machine X1. The cab 2 is positioned on the front side in the front-rear direction of the upper swinging body 200. Moreover, the cab 2 is positioned on a lateral side of the attachment 1. The operator of the construction machine X1 can control the lower traveling body 100 and the attachment 1 by getting on the control room inside the cab 2.

Figure 2:
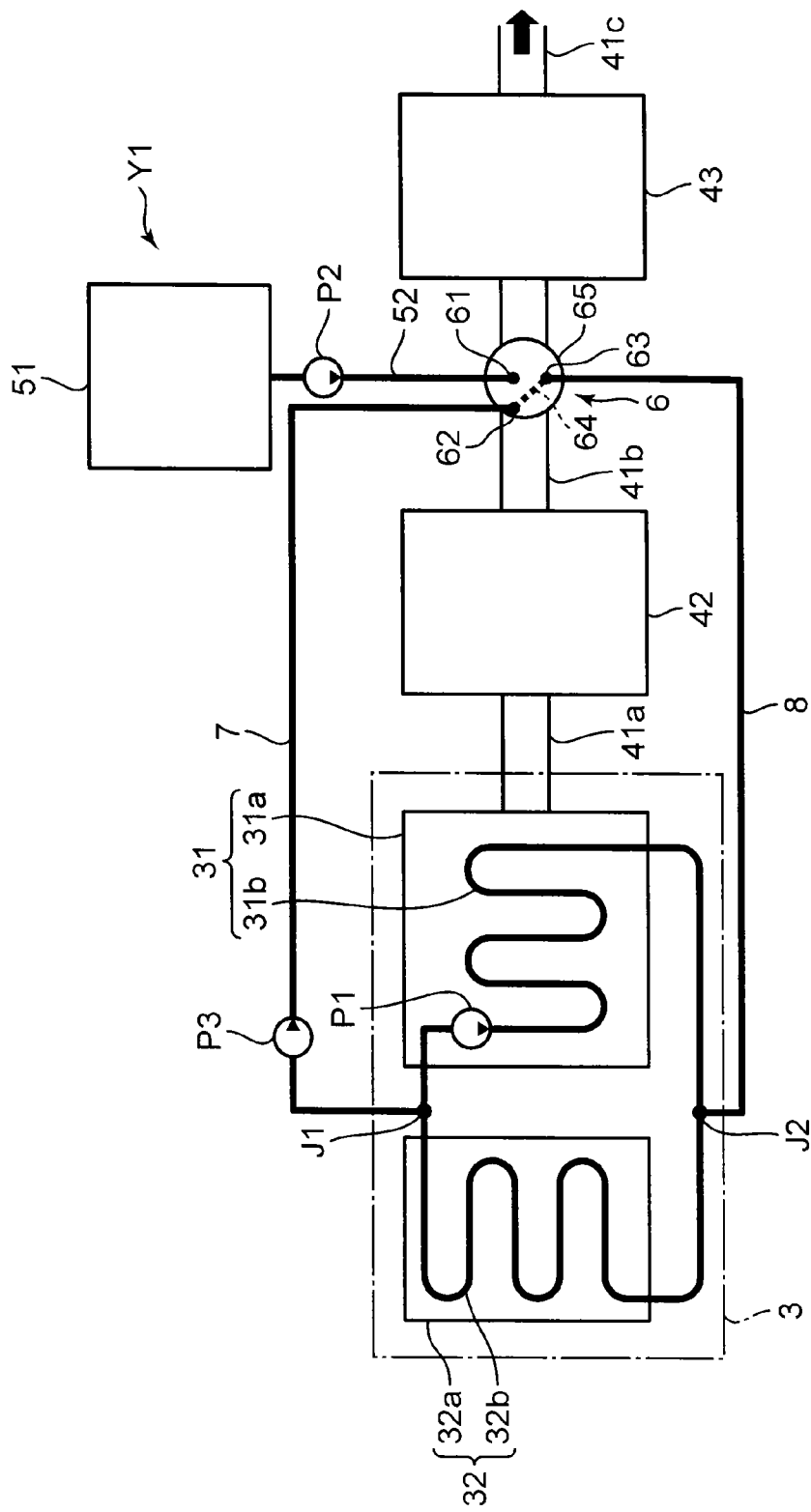
FIG. 2 is a schematic view illustrating a main portion of the construction machine according to the present embodiment.

Next, the engine unit 3 and an exhaust gas processing device Y1 will be described with reference to FIG. 2 as well as FIG. 1.

The engine unit 3 includes an engine 31 and a radiator 32.

The engine 31 includes an engine body 31a and an engine cooling pipe 31b. The engine body 31a is a power source that operates various members included in the construction machine X1 such as the lower traveling body 100, the upper swinging body 200, and the attachment 1. Specifically, the engine body 31a drives a hydraulic pump for operating the lower traveling body 100, the upper swinging body 200, and the attachment 1, for example. The engine cooling pipe 31b is a pipe that passes through the inside of the engine body 31a.

The radiator 32 has a radiator body 32a and a radiator pipe 32b. The radiator body 32a accelerates radiation of heat in the radiator pipe 32b. The radiator pipe 32b is a pipe that passes through the inside of the radiator body 32a. One end of the radiator pipe 32b is connected to one end of the engine cooling pipe 31b, and the other end of the radiator pipe 32b is connected to the other end of the engine cooling pipe 31b. Thus, the engine cooling pipe 31b and the radiator pipe 32b are connected in a circular form, and a cooling water circulation path formed by the engine cooling pipe 31b and the radiator pipe 32b is an engine unit circulation path C1.

The engine unit 3 further includes an engine cooling water circulation pump P1. The engine cooling water circulation pump P1 is driven using the engine body 31a as a power source and causes cooling water to circulate along the engine unit circulation path C1.

The engine cooling water circulation pump P1 is connected to the engine unit circulation path C1. The cooling water circulating along the engine unit circulation path C1 by the engine cooling water circulation pump P1 exchanges heat with the engine body 31a when passing through the engine cooling pipe 31b, whereby the engine body 31a is cooled. Moreover, the cooling water heated by the engine body 31a when passing through the engine cooling pipe 31b is cooled in the radiator body 32a when passing through the radiator pipe 32b, whereby the cooled cooling water passes through the engine cooling pipe 31b again.

The exhaust gas processing device Y1 includes an exhaust gas processing unit 4 and a urea water supply device 5.

The exhaust gas processing unit 4 purifies exhaust gas discharged from the engine body 31a. The exhaust gas processing unit 4 includes an exhaust pipe 41, a particle collecting unit 42, and a nitrogen oxide purifying unit 43.

The exhaust pipe 41 guides the exhaust gas discharged from the engine body 31a to the outside of the construction machine X1. The exhaust pipe 41 includes a first exhaust pipe 41a, a second exhaust pipe 41b, and a third exhaust pipe 41c. The first exhaust pipe 41a is disposed between the engine 31 and the particle collecting unit 42. The second exhaust pipe 41b is disposed between the particle collecting unit 42 and the nitrogen oxide purifying unit 43. The third exhaust pipe 41c is disposed between the nitrogen oxide purifying unit 43 and the outside of the construction machine X1. The exhaust gas discharged from the engine body 31a passes sequentially through the first exhaust pipe 41a, the particle collecting unit 42, the second exhaust pipe 41b, the nitrogen oxide purifying unit 43, and the third exhaust pipe 41c and is guided to the outside of the construction machine X1.

The particle collecting unit 42 collects particulate substances included in the exhaust gas. The particulate substances included in the exhaust gas passing through the particle collecting unit 42 are collected in the particle collecting unit 42. The particulate substances collected in the particle collecting unit 42 are removed by combustion.

The nitrogen oxide purifying unit 43 purifies nitrogen oxides in the exhaust gas using the urea water supplied from the urea water supply device 5 described later. The nitrogen oxide purifying unit 43 has a urea water-selective reduction catalyst.

The urea water supply device 5 is a device that supplies urea water to the second exhaust pipe 41b of the exhaust gas processing unit 4. The urea water supply device 5 includes a urea water tank 51, a urea water supply pipe 52, and a urea water supply valve 6.

The urea water tank 51 is a tank that accommodates urea water as a reduction agent that reduces the exhaust gas.

The urea water supply pipe 52 is a pipe that guides the urea water accommodated in the urea water tank 51 to the second exhaust pipe 41b. One end of the urea water supply pipe 52 is connected to the urea water tank 51. Moreover, the other end of the urea water supply pipe 52 is connected to a urea water injector 61 of the urea water supply valve 6 described later.

The urea water supply valve 6 is a valve that guides the urea water passing through the urea water supply pipe 52 to the second exhaust pipe 41b. The urea water supply valve 6 is attached to the second exhaust pipe 41b. Moreover, the urea water supply valve 6 includes the urea water injector 61 that communicates with the inside of the second exhaust pipe 41b and the outside of the second exhaust pipe 41b and a casing 65 that holds the urea water injector 61. The urea water injector 61 is connected to the other end of the urea water supply pipe 52. In the present embodiment, although the urea water supply valve 6 is employed as a reduction agent supply unit according to the present invention, the present invention is not limited to this, and the reduction agent supply unit according to the present invention may be a member that can supply urea water to the second exhaust pipe 41b.

The urea water supply device 5 further includes a urea water supply pump P2. The urea water supply pump P2 is driven using the engine body 31a as a power source and guides the urea water accommodated in the urea water tank 51 to the urea water supply pipe 52.

The urea water supply pump P2 is connected to the urea water supply pipe 52. The urea water accommodated in the urea water tank 51 is guided to the urea water supply pipe 52 by the urea water supply pump P2 and is supplied to the second exhaust pipe 41b through the urea water injector 61 of the urea water supply valve 6.

The urea water supplied from the urea water tank 51 to the second exhaust pipe 41b through the urea water injector 61 of the urea water supply valve 6 in this manner becomes ammonia by the urea water selective reduction catalyst in the nitrogen oxide purifying unit 43 positioned closer to the downstream side than the second exhaust pipe 41b. In the exhaust gas processing device Y1, a reduction reaction of the ammonia and the nitrogen oxides in the exhaust gas occurs, whereby the nitrogen oxides are decomposed into water and nitrogen.

By the way, since the urea water supply valve 6 is attached to the second exhaust pipe 41b, the temperature of the urea water supply valve 6 may increase with the heat of the exhaust gas when the engine body 31a is driven and the exhaust gas passes through the second exhaust pipe 41b. When the temperature of the urea water supply valve 6 increases, the temperature of the urea water passing through the urea water injector 61 of the urea water supply valve 6 may also increase. As a result, an excessively large amount of ammonia may be generated from the urea water that is hydrolyzed, and the exhaust gas processing unit 4 may corrode.

Thus, the exhaust gas processing device Y1 further includes a cooling water circulating device that cools the urea water supply valve 6 to suppress an increase in the temperature of the urea water supply valve 6.

Specifically, the cooling water circulating device of the exhaust gas processing device Y1 includes a cooling unit 64, a cooling water inlet pipe 7 through which cooling water flows into the cooling unit 64, and a cooling water outlet pipe 8 through which cooling water flows out of the cooling unit 64.

The cooling unit 64 causes the cooling water passing through the cooling unit 64 to exchange heat with the urea water supply valve 6. The cooling unit 64 includes a cooling water passage formed in the casing 65 of the urea water supply valve 6. In the present embodiment, the entire region of the cooling water passage formed in the casing 65 is the cooling unit 64. The cooling unit 64 has a first end portion 63 and a second end portion 62 positioned on the opposite side of the first end portion 63. The first end portion 63 of the cooling unit 64 communicates with the inside and the outside of the casing 65. Moreover, the second end portion 62 of the cooling unit 64 communicates with the inside and the outside of the casing 65.

The cooling water inlet pipe 7 is a pipe that corresponds to a second connection pipe according to the present invention. One end of the cooling water inlet pipe 7 is connected to the second end portion 62 of the cooling unit 64. Moreover, the other end of the cooling water inlet pipe 7 is connected to a junction point J1 between an end portion on the cooling water outlet side of the radiator pipe 32b and an end portion on the cooling water inlet side of the engine cooling pipe 31b.

The cooling water outlet pipe 8 is a pipe that corresponds to a first connection pipe according to the present invention. One end of the cooling water outlet pipe 8 is connected to the first end portion 63 of the cooling unit 64. Moreover, the other end of the cooling water outlet pipe 8 is connected to a junction point J2 between an end portion on the cooling water inlet side of the radiator pipe 32b and an end portion on the cooling water outlet side of the engine cooling pipe 31b.

In this manner, in the construction machine X1, the radiator pipe 32b, the cooling water inlet pipe 7, the cooling unit 64, and the cooling water outlet pipe 8 are connected in a circular form. Due to this, a portion of the cooling water flowing through the radiator pipe 32b circulates along the cooling water inlet pipe 7, the cooling unit 64, and the cooling water outlet pipe 8. This cooling water circulation path is a supply valve cooling water circulation path C2.

The cooling water circulating device of the exhaust gas processing device Y1 further includes a supply valve cooling water circulation pump P3. The supply valve cooling water circulation pump P3 is driven using the engine body 31a as a power source and causes cooling water to circulate along the supply valve cooling water circulation path C2.

The supply valve cooling water circulation pump P3 is connected to the cooling water inlet pipe 7, for example. In the exhaust gas processing device Y1, a portion of the cooling water flowing through the radiator pipe 32b is guided to the cooling water inlet pipe 7 by the supply valve cooling water circulation pump P3 and flows into the cooling unit 64 through the second end portion 62. The cooling unit 64 exchanges the heat of the cooling water flowing into the cooling unit 64 through the second end portion 62 with the urea water supply valve 6 to thereby suppress an increase in the temperature of the urea water supply valve 6. Moreover, the cooling water heated in the cooling unit 64 is guided to the cooling water outlet pipe 8 through the first end portion 63 and flows into the radiator pipe 32b. The cooling water flowing from the cooling water outlet pipe 8 into the radiator pipe 32b is cooled by the radiator body 32a.

In the present embodiment, the radiator pipe 32b supplies the cooling water to the engine cooling pipe 31b for cooling the engine body 31a and supplies the cooling water to the cooling unit 64 through the cooling water inlet pipe 7. Due to this, the radiator pipe 32b has a role of supplying cooling water to the engine cooling pipe 31b and has the role of a cooling water accommodation unit according to the present invention. The exhaust gas processing device Y1 may have a cooling water accommodation unit independent from the radiator pipe 32b. In this case, the cooling water accommodation unit independent from the radiator pipe 32b supplies cooling water to the cooling unit 64 through the cooling water inlet pipe 7.

Moreover, in the present embodiment, although the supply valve cooling water circulation pump P3 is employed as a circulating device according to the present invention, the present invention is not limited to this. For example, a motor or the like driven using the engine body 31a as a power source may be employed as the circulating device according to the present invention.

Figure 3:
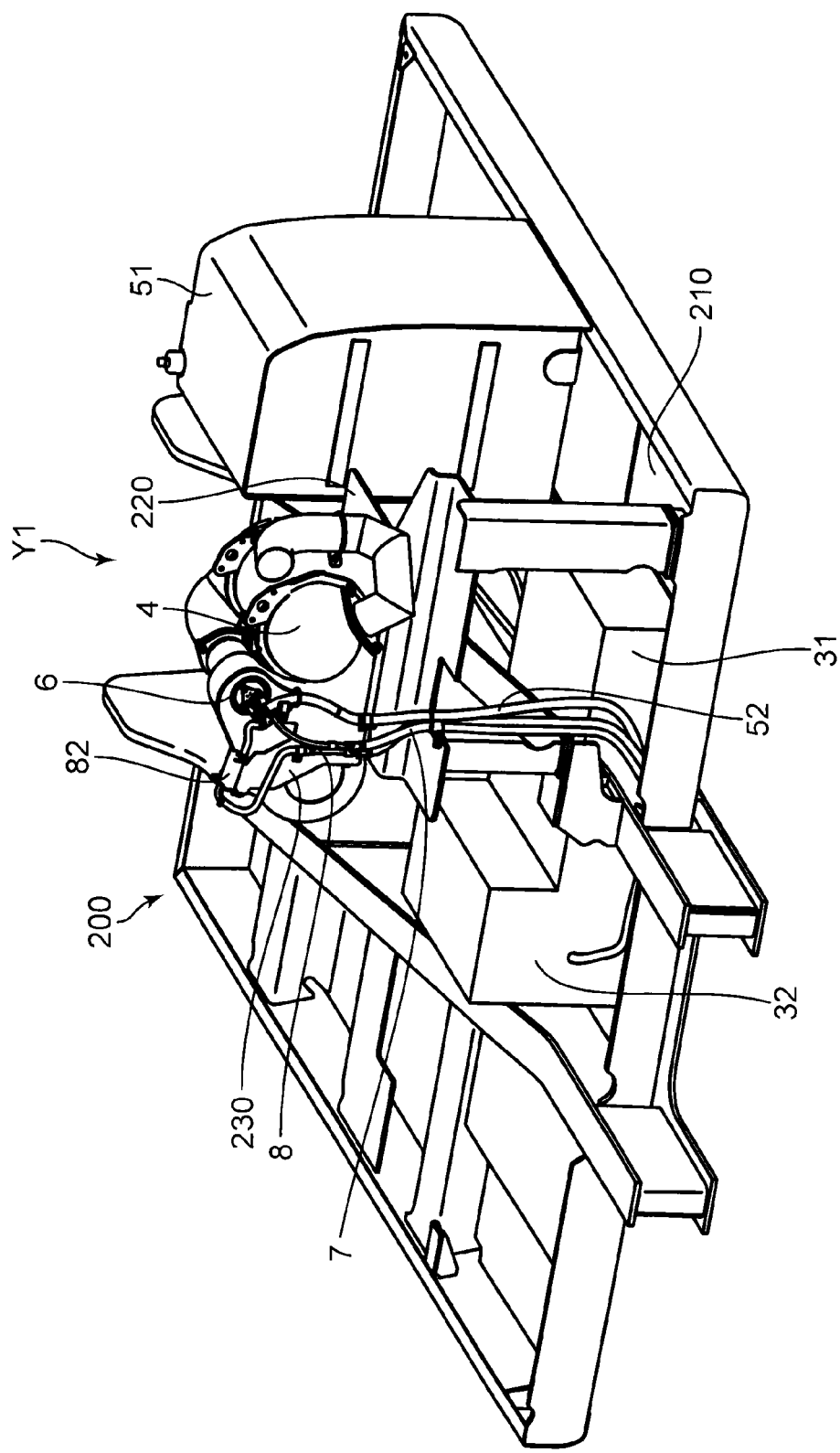
FIG. 3 is a schematic perspective rear view illustrating a main portion of the construction machine according to the present embodiment.
Figure 4:
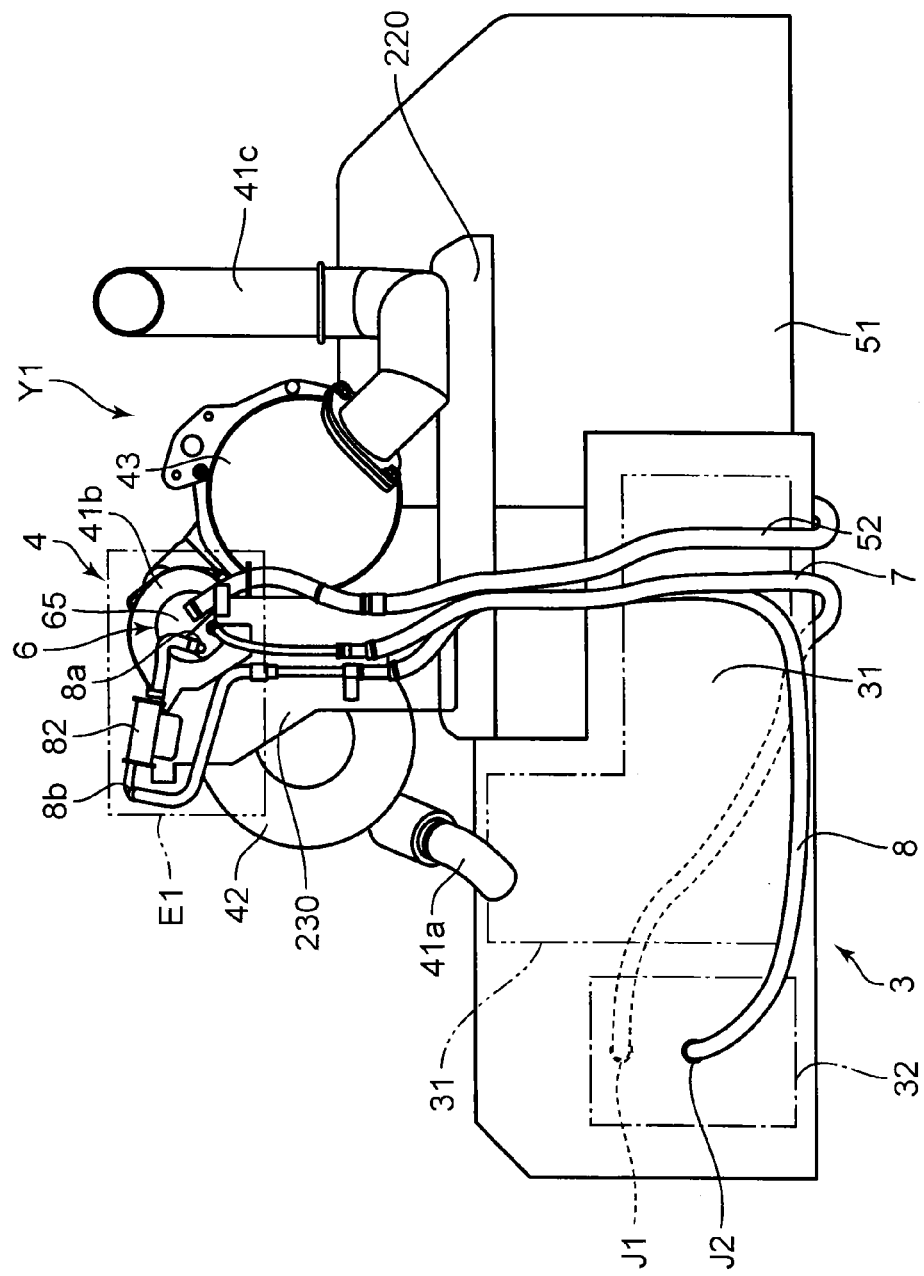
FIG. 4 is a schematic rear view of a main portion of the construction machine according to the present embodiment.
Figure 5:
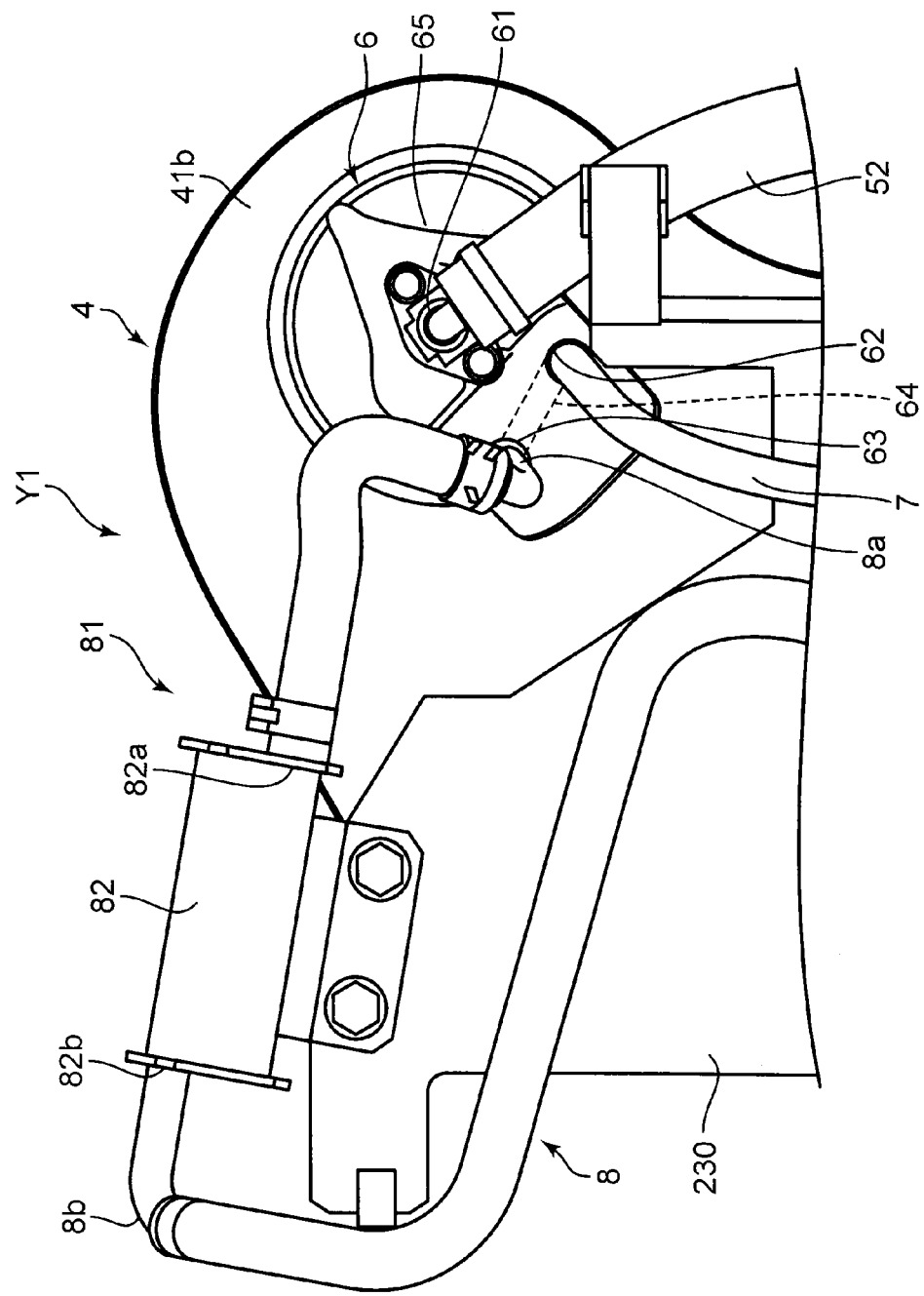
FIG. 5 is an enlarged view of region E1 indicated by a one-dot chain line in FIG. 4.

Next, a positional relation between the upper swinging body 200 of the construction machine X1, the engine unit 3, and the exhaust gas processing device Y1 will be described in detail with reference to FIGS. 3 to 5 as well as FIGS. 1 and 2.

The upper swinging body 200 includes a first support plate 210, a second support plate 220, and a third support plate 230. The first support plate 210 forms a floor portion of the upper swinging body 200. The second support plate 220 is provided above the first support plate 210 along the planar direction of the first support plate 210. The third support plate 230 extends upward from the second support plate 220 in a direction orthogonal to the second support plate 220.

The engine unit 3 is mounted on the first support plate 210 of the upper swinging body 200. Moreover, the engine unit 3 is positioned on the rear side in the front-rear direction of the upper swinging body 200. The engine 31 and the radiator 32 of the engine unit 3 are positioned in line in the left-right direction of the upper swinging body 200.

The exhaust gas processing unit 4 of the exhaust gas processing device Y1 is positioned above the engine unit 3. The exhaust gas processing unit 4 is positioned on the second support plate 220 of the upper swinging body 200. The engine 31 is positioned in a region between the first support plate 210 and the second support plate 220. Moreover, the entire radiator 32 is positioned on the lower side than the exhaust gas processing unit 4. In the construction machine X1, since the exhaust gas processing unit 4 is positioned above the engine unit 3, it is possible to decrease the size of the construction machine X1 in the planar direction of the first support plate 210.

In the exhaust gas processing device Y1, the urea water tank 51 of the urea water supply device 5 is mounted on the first support plate 210 of the upper swinging body 200. Specifically, the urea water tank 51 is positioned on the front side of the engine unit 3 and the exhaust gas processing unit 4 in the front-rear direction of the upper swinging body 200.

In the exhaust gas processing device Y1, the urea water supply pipe 52 of the urea water supply device 5 is connected to the urea water tank 51 and is guided toward the rear side of the engine unit 3 from the lower side of the engine unit 3. Moreover, the urea water supply pipe 52 guided to the rear side of the engine unit 3 extends toward the exhaust gas processing unit 4 positioned above the engine unit 3.

In the exhaust gas processing device Y1, the urea water supply valve 6 of the urea water supply device 5 is attached to the second exhaust pipe 41b of the exhaust gas processing unit 4. Due to this, the urea water supply valve 6 is positioned on an upper side than the engine unit 3. The urea water supply valve 6 has the urea water injector 61 and the casing 65 that holds the urea water injector 61. The urea water supply pipe 52 extending toward the exhaust gas processing unit 4 from the rear side of the engine unit 3 is connected to the urea water injector 61 of the urea water supply valve 6.

In the exhaust gas processing device Y1, the cooling unit 64 of the cooling water circulating device is formed inside the casing 65 of the urea water supply valve 6. Specifically, the cooling unit 64 includes the cooling water passage formed inside the casing 65. The first end portion 63 of the cooling unit 64 communicates with the inside and the outside of the casing 65, and the second end portion 62 of the cooling unit 64 communicates with the inside and the outside of the casing 65. In the present embodiment, the first end portion 63 of the cooling unit 64 is positioned on the uppermost side of the cooling unit 64. Moreover, since the urea water supply valve 6 is positioned on an upper side than the engine unit 3, the cooling unit 64 formed in the casing 65 of the urea water supply valve 6 is positioned on an upper side than the radiator pipe 32b of the engine unit 3.

In the present embodiment, since the entire radiator 32 is positioned on the lower side than the exhaust gas processing unit 4 and the cooling unit 64 is formed in the urea water supply valve 6 attached to the second exhaust pipe 41b of the exhaust gas processing unit 4, the entire radiator pipe 32b is positioned on the lower side than the cooling unit 64. That is, in the present embodiment, the entire radiator pipe 32b corresponds to a lower portion of the cooling water accommodation unit according to the present invention.

In the exhaust gas processing device Y1, the cooling water inlet pipe 7 of the cooling water circulating device is connected to the second end portion 62 of the cooling unit 64. The cooling water inlet pipe 7 connected to the second end portion 62 of the cooling unit 64 extends toward the lower side of the exhaust gas processing unit 4 and is connected to the engine unit 3 from the rear side of the engine unit 3. Specifically, the cooling water inlet pipe 7 is connected to the junction point J1 between the end portion on the cooling water outlet side of the radiator pipe 32b and the end portion on the cooling water inlet side of the engine cooling pipe 31b. Here, since the cooling unit 64 is positioned on an upper side than the radiator pipe 32b as described above, the junction point J1 between the cooling water inlet pipe 7 and the radiator pipe 32b is positioned on the lower side than the second end portion 62 of the cooling unit 64.

In the exhaust gas processing device Y1, the cooling water outlet pipe 8 of the cooling water circulating device is connected to the first end portion 63 of the cooling unit 64. The cooling water outlet pipe 8 connected to the first end portion 63 of the cooling unit 64 extends toward the lower side of the exhaust gas processing unit 4 and is guided toward the lower side of the engine unit 3 from the rear side of the engine unit 3 and is connected to the engine unit 3 from the front side of the engine unit 3. Specifically, the cooling water outlet pipe 8 is connected to the junction point J2 between the end portion on the cooling water inlet side of the radiator pipe 32b and the end portion on the cooling water outlet side of the engine cooling pipe 31b. Here, since the cooling unit 64 is positioned on an upper side than the radiator pipe 32b as described above, the junction point J2 between the cooling water outlet pipe 8 and the radiator pipe 32b is positioned on the lower side than the first end portion 63 of the cooling unit 64.

The exhaust gas processing device Y1 includes the cooling unit 64 through which the cooling water is allowed to pass and the cooling unit 64 causes the cooling water to exchange heat with the urea water supply valve 6, whereby an increase in the temperature of the urea water supply valve 6 can be suppressed.

However, in the exhaust gas processing device Y1, the exhaust gas processing unit 4 is disposed above the engine unit 3 due to layout reasons, and as a result, the cooling water inlet pipe 7 and the cooling water outlet pipe 8 are connected to the radiator pipe 32b on a lower side than the cooling unit 64. Thus, the temperature of the cooling water in the cooling unit 64 may increase abruptly when the engine 31 stops. Although discharging of the exhaust gas from the engine 31 stops when the engine body 31a stops, hot exhaust gas discharged before the engine body 31a stops remains in the second exhaust pipe 41b of the exhaust gas processing unit 4. Due to this, even after the engine body 31a stops, the temperature of the urea water supply valve 6 may increase due to the exhaust gas remaining in the second exhaust pipe

41b. On the other hand, the driving of the engine cooling water circulation pump P1 stops when the engine body 31a stops, and as a result, the circulation of the cooling water in the supply valve cooling water circulation path C2 also stops. Due to this, the cooling water in the cooling unit 64 boils with the heat of the exhaust gas, and as a result, hot gas may remain in the cooling unit 64. In such a case, when the cooling water inlet pipe 7 and the cooling water outlet pipe 8 are connected to the radiator pipe 32b on the lower side than the cooling unit 64, new cooling water cannot flow into the cooling unit 64 easily and the urea water supply valve 6 may be destroyed with the heat of the gas remaining in the cooling unit 64.

Figure 6:
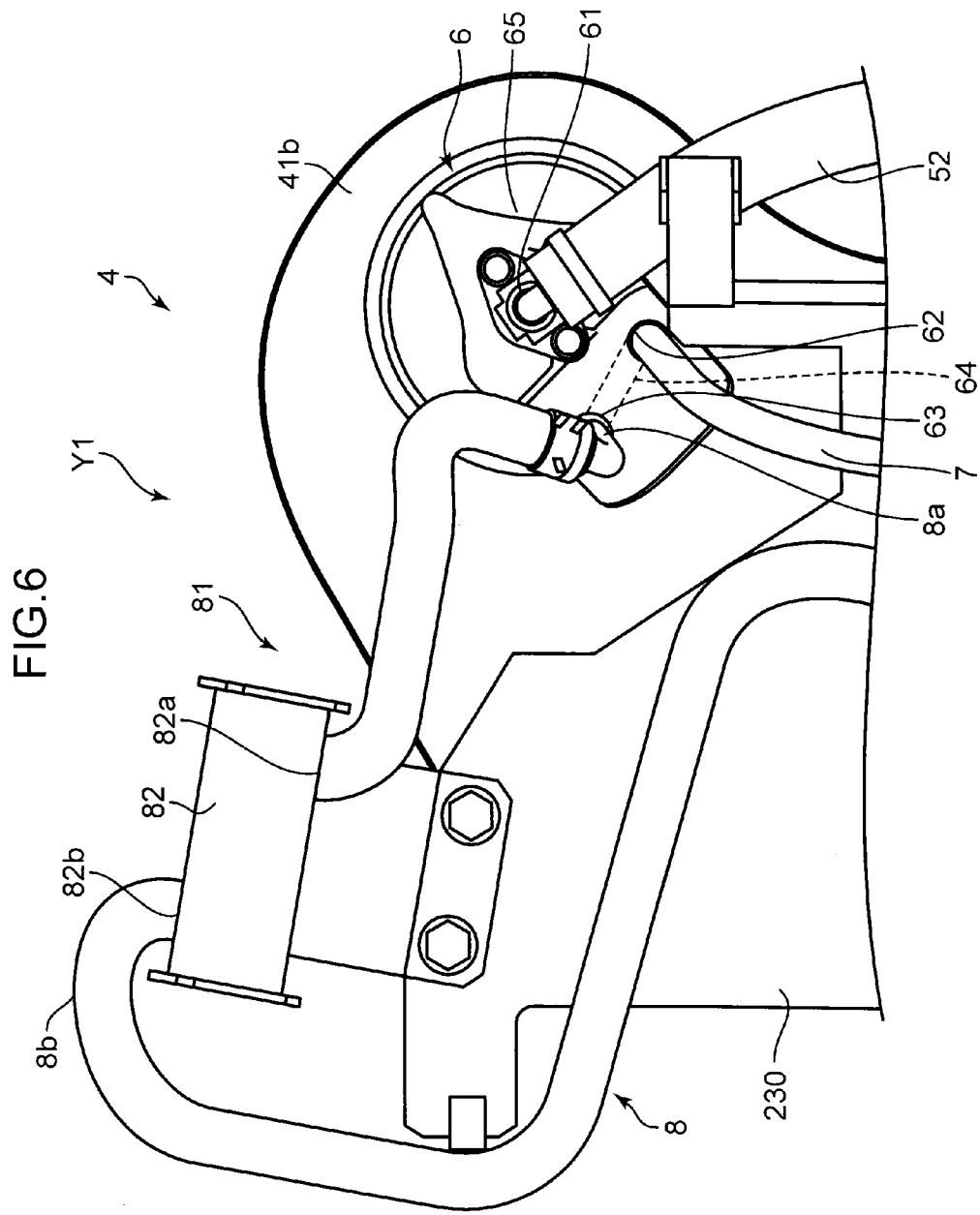
FIG. 6 is a diagram illustrating a modification of the construction machine according to the present embodiment and is a diagram illustrating the same portion as FIG. 5.

Thus, in the exhaust gas processing device Y1, as illustrated in FIG. 6, the cooling water outlet pipe 8 includes a connection portion 8a connected to the first end portion 63 of the cooling unit 64, an apex portion 8b positioned on the uppermost side of the cooling water outlet pipe 8, and a supplying portion 81 positioned between the connection portion 8a and the apex portion 8b.

The cooling water outlet pipe 8 is supported by the third support plate 230 of the upper swinging body 200, and as a result, the apex portion 8b is positioned above the cooling unit 64. In the present embodiment, an entire region of the cooling water outlet pipe 8 extending from the connection portion 8a to the apex portion 8b is positioned on the upper side than the cooling unit 64, and the entire region is the supplying portion 81. A portion of the region of the cooling water outlet pipe 8 extending from the connection portion 8a to the apex portion 8b may be positioned on the lower side than the cooling unit 64. When the supply valve cooling water circulation pump P3 stops so that the engine body 31a stops, the circulation of the cooling water in the supply valve cooling water circulation path C2 stops, and the cooling water in the cooling unit 64 boils and becomes hot gas, the supplying portion 81 supplies cooling water in the supplying portion 81 to the cooling unit 64 instead of the gas. The supplying portion 81 has such a volume that a sufficient amount of cooling water can be supplied to the cooling unit 64. In the present embodiment, the supplying portion 81 has a cooling water storage portion 82. The cooling water storage portion 82 has a larger inner cross-sectional area than an inner cross-sectional area of a region of the cooling water outlet pipe 8 other than the cooling water storage portion 82. An amount of cooling water sufficient for supplying to the cooling unit 64 is accommodated in the cooling water storage portion 82.

In this manner, in the exhaust gas processing device Y1, when the cooling water in the cooling unit 64 boils when the engine body 31a stops, it is possible to supply new cooling water from the supplying portion 81 to the cooling unit 64. Due to this, it is possible to suppress an abrupt increase in the temperature of the urea water supply valve 6 when the engine body 31a stops.

In the present embodiment, although cooling water flows into the cooling unit 64 through the second end portion 62 of the cooling unit 64 and flows out of the cooling unit 64 through the first end portion 63 of the cooling unit 64 when the engine body 31a is driven, the present invention is not limited to this. The cooling water may flow into the cooling unit 64 through the first end portion 63 of the cooling unit 64 and may flow out of the cooling unit 64 through the second end portion 62 of the cooling unit 64. In such a case, the same advantages as the exhaust gas processing device Y1 according to the present embodiment are obtained.

Further, in the exhaust gas processing device Y1, since the cooling unit 64 includes the cooling water passage formed in the casing 65 of the urea water supply valve 6, the urea water supply valve 6 is cooled directly by the cooling water passing through the cooling unit 64 when the engine body 31a is driven. As a result, an increase in the temperature of the urea water supply valve 6 is suppressed further. In particular, in the exhaust gas processing device Y1, since the cooling unit 64 includes the cooling water passage formed in the casing 65 of the urea water supply valve 6, it is possible to decrease a separation distance between the urea water injector 61 through which the urea water passes and the cooling unit 64 through which the cooling water passes. Therefore, it is possible to cool a portion of the urea water supply valve 6 surrounding the urea water injector 61 in an intensive manner. Due to this, it is possible to further suppress an increase in the temperature of the urea water passing through the urea water injector 61.

In the present embodiment, although the cooling unit 64 includes the cooling water passage formed in the casing 65 of the urea water supply valve 6 as described above, the present invention is not limited to this. For example, the cooling unit 64 may include a cooling pipe 64' independent from the casing 65. In this case, one end of the cooling pipe 64' is connected to the cooling water outlet pipe 8 and the other end of the cooling pipe 64' is connected to the cooling water inlet pipe 7. Moreover, the cooling pipe 64' makes contact with the urea water supply valve 6, whereby the cooling water passing through the cooling pipe 64' exchanges heat with the urea water supply valve 6. In this case, the cooling unit 64 includes a region of the cooling pipe 64' making contact with the urea water supply valve 6.

Further, in the exhaust gas processing device Y1, since the supplying portion 81 has the cooling water storage portion 82, it is possible to supply a sufficient amount of cooling water from the cooling water storage portion 82 to the cooling unit 64 when the engine body 31a stops even when the length of the supplying portion 81 is not increased remarkably. Due to this, it is possible to suppress an abrupt increase in the temperature of the urea water supply valve 6.

Further, in the exhaust gas processing device Y1, since the first end portion 63 of the cooling unit 64 connected to the connection portion 8a of the cooling water outlet pipe 8 is positioned on the uppermost side of the cooling unit 64, cooling water can easily flow from the supplying portion 81 to the cooling unit 64 when the engine body 31a stops. Due to this, it is possible to suppress an abrupt increase in the temperature of the urea water supply valve 6.

The cooling water storage portion 82 has an inlet portion 82a and an outlet portion 82b as a new feature of the exhaust gas processing device Y1, and the cooling water storage portion 82 is inclined so that the outlet portion 82b is positioned on the upper side than the inlet portion 82a. The inlet portion 82a is a region into which cooling water flows from the connection portion 8a when the engine body 31a is driven. The outlet portion 82b is a region from which the cooling water flows out of the cooling water storage portion 82 when the engine body 31a is driven.

In this manner, in the exhaust gas processing device Y1, since the cooling water storage portion 82 is inclined so that the outlet portion 82b is positioned on the upper side than the inlet portion 82a, it is possible to suppress bubbles from remaining in the cooling water storage portion 82 when the cooling water circulates through the supply valve cooling water circulation path C2 when the engine body 31a is driven. Due to this, it is possible to fill the cooling water storage portion 82 with cooling water when the engine body 31a is driven. As a result, it is possible to supply a sufficient amount of cooling water from the cooling water storage portion 82 to the cooling unit 64 when the engine body 31*a* stops.

In the present embodiment, although the inlet portion 82*a* and the outlet portion 82*b* are provided on side surfaces of the cooling water storage portion 82, the present invention is not limited to this, and the positions of the inlet portion 82*a* and the outlet portion 82*b* are optional and can be changed appropriately depending on how the exhaust gas processing device Y1 is used.

For example, as illustrated in FIG. 6, the inlet portion 82*a* may be formed on the lower surface of the cooling water storage portion 82 and the outlet portion 82*b* may be formed on the upper surface of the supplying portion 81. According to such a configuration, it is possible to suppress bubbles from remaining in the cooling water storage portion 82 when the cooling water circulates through the supply valve cooling water circulation path C2 when the engine body 31*a* is driven.

Figure 7:
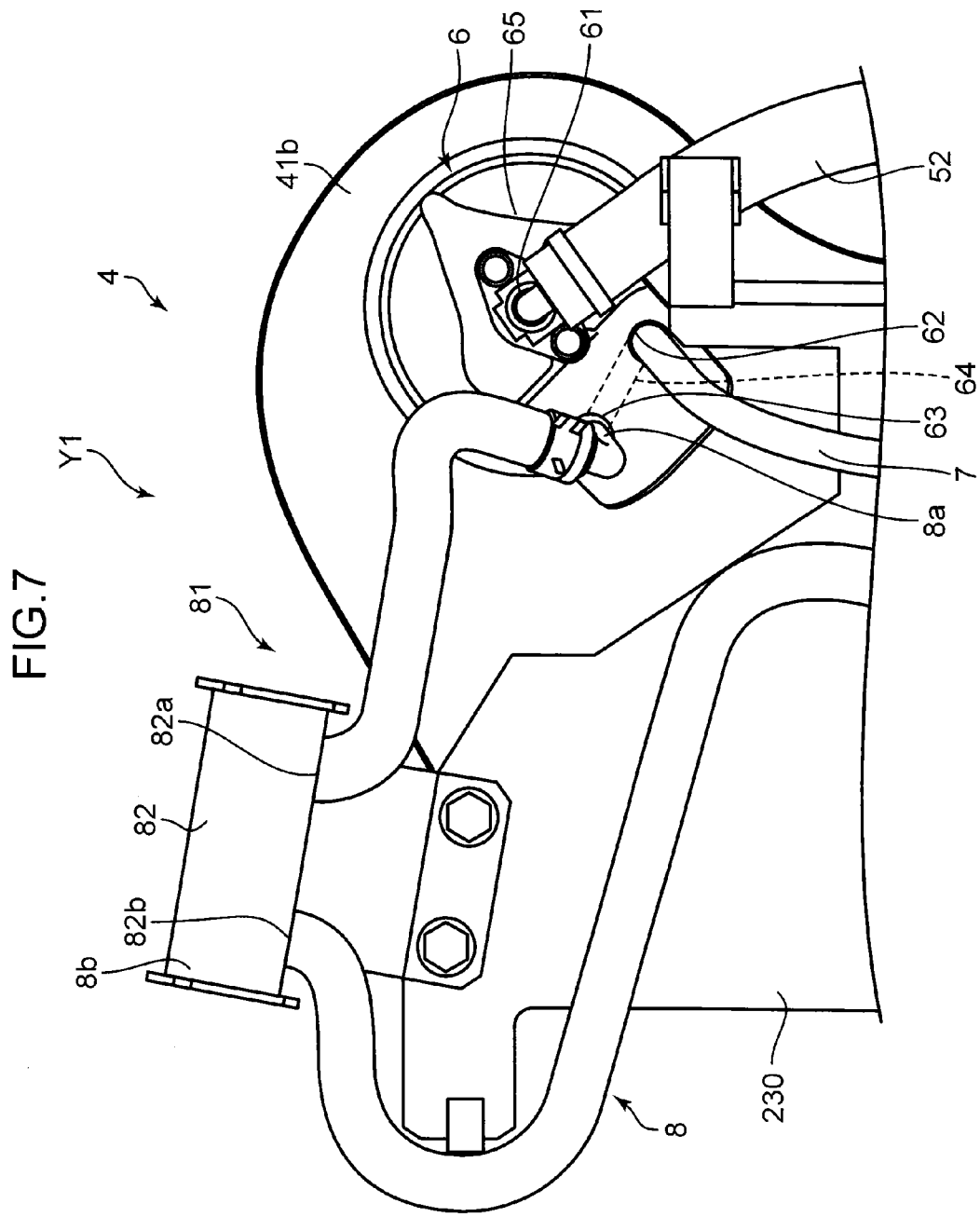
FIG. 7 is a diagram illustrating another modification of the construction machine according to the present embodiment and is a diagram illustrating the same portion as FIG. 5.

Moreover, as illustrated in FIG. 7, both the inlet portion 82*a* and the outlet portion 82*b* may be formed on the lower surface of the cooling water storage portion 82, and the apex portion 8*b* of the cooling water outlet pipe 8 may be arranged to form the cooling water storage portion 82. According to such a configuration, when the engine body 31*a* stops so that the cooling water in the cooling unit 64 boils whereby a portion of the cooling water becomes gas and gas-liquid exchange occurs between the gas and the cooling water of the supplying portion 81, the cooling water storage portion 82 can efficiently cool the gas rising toward the apex portion 8*b* of the cooling water outlet pipe 8.

Moreover, in the embodiment, although the supplying portion 81 has the cooling water storage portion 82, the present invention is not limited to this, and the supplying portion 81 may not have the cooling water storage portion 82.

Figure 8:
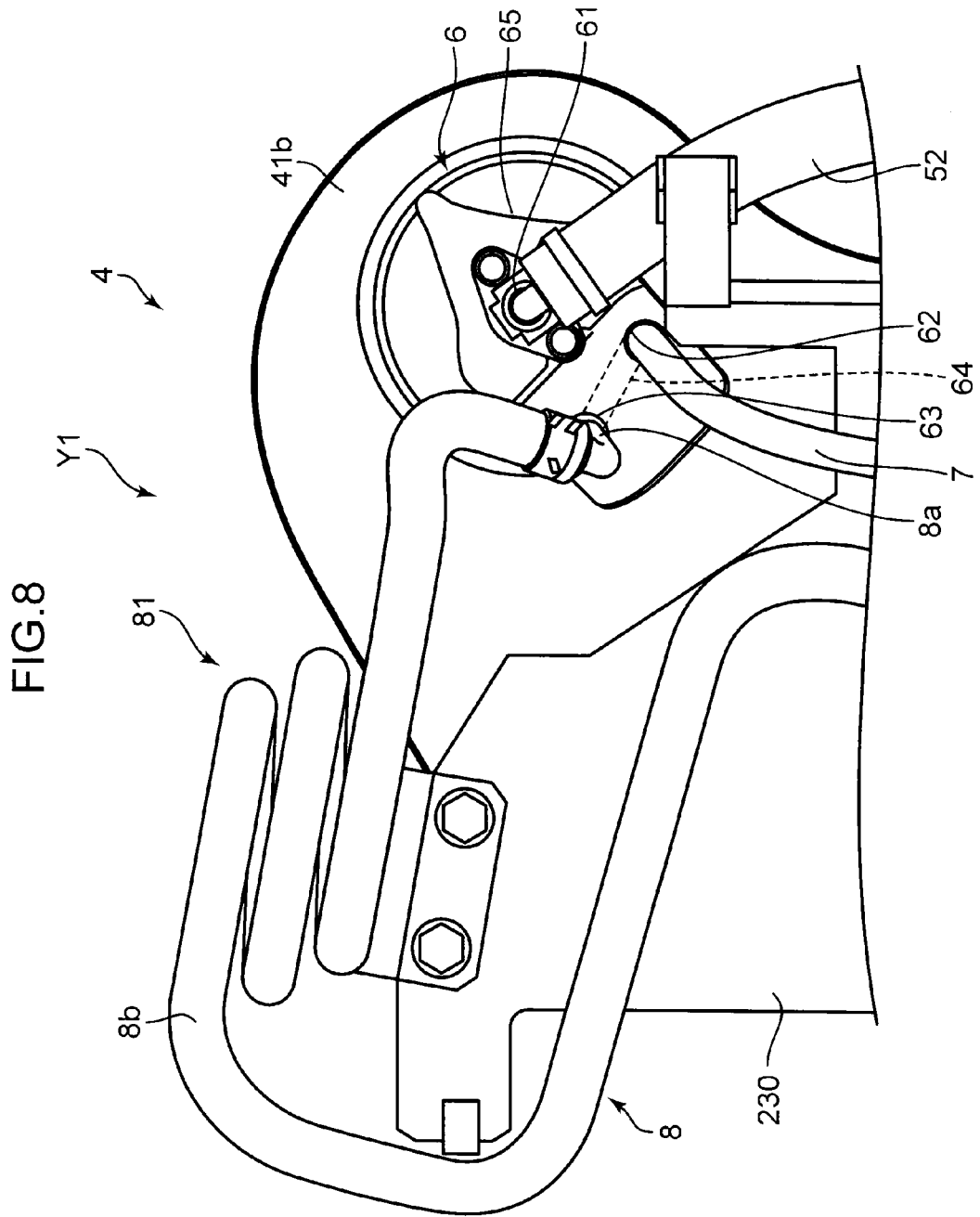
FIG. 8 is a diagram illustrating another modification of the construction machine according to the present embodiment and is a diagram illustrating the same portion as FIG. 5.
Figure 9:
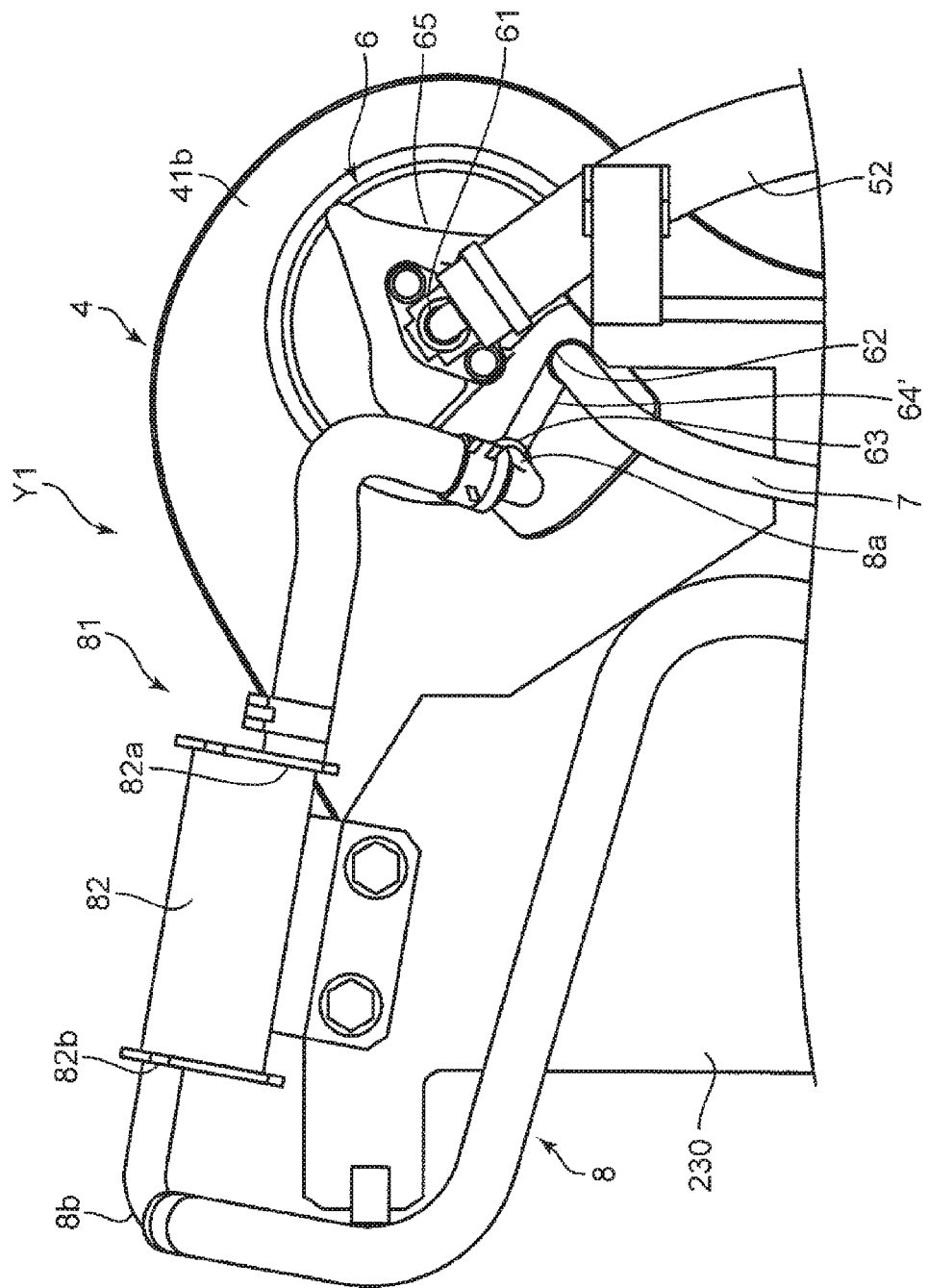
FIG. 9 is a diagram illustrating still another modification of the construction machine according to the present embodiment and is a diagram illustrating the same portion as FIG. 5.

For example, as illustrated in FIG. 8, the supplying portion 81 may not have the cooling water storage portion 82 and the supplying portion 81 may have a spiral form. According to such a configuration, it is possible to increase a cooling water accommodation volume of the supplying portion 81 while disposing the supplying portion 81 in a relatively narrow space. As a result, it is possible to supply a sufficient amount of cooling water from the cooling water storage portion 82 to the cooling unit 64 when the engine body 31*a* stops.

The specific embodiment described above include inventions having the following configuration.

That is, an exhaust gas processing device according to the present invention is an exhaust gas processing device that is provided in a construction machine having an engine and that processes exhaust gas of the engine, the exhaust gas processing device including: an exhaust gas processing unit that is positioned above the engine so as to allow the exhaust gas of the engine to pass through the exhaust gas processing unit; a reduction agent tank that accommodates a reduction agent capable of reducing the exhaust gas; a reduction agent supply unit that is attached to the exhaust gas processing unit so as to supply the reduction agent accommodated in the reduction agent tank into the exhaust gas processing unit; a cooling unit that has a first end portion and a second end portion positioned on an opposite side to the first end portion, the cooling portion allowing cooling water to pass through the cooling unit and then allow the cooling water passing through the cooling unit to exchange heat with the reduction agent supply unit, thereby cooling the reduction agent supply unit; a cooling water accommodation unit that has a lower portion positioned below the cooling unit and accommodates cooling water to be supplied to the cooling unit; a first connection pipe that connects the first end portion of the cooling unit and the cooling water accommodation unit; a second connection pipe that connects the second end portion of the cooling unit and the cooling water accommodation unit; and a circulating device that is driven by the engine so as to cause the cooling water to circulate through the first connection pipe and the second connection pipe such that the cooling water accommodated in the cooling water accommodation unit flows into the cooling unit through one of the first end portion and the second end portion of the cooling unit and flows out of the cooling unit through the other one of the first end portion and the second end portion of the cooling unit, wherein the first connection pipe and the second connection pipe are connected to the lower portion of the cooling water accommodation unit, and the first connection pipe includes: a connection portion connected to the first end portion of the cooling unit; an apex portion positioned on an uppermost side of the first connection pipe and above the cooling unit; and a supplying portion positioned between the connection portion and the apex portion so that cooling water in the supplying portion can be supplied to the cooling unit in place of the cooling water boiled in the cooling unit when the engine is stopped.

According to the exhaust gas processing device, the circulating device driven by the engine of the construction machine supplies cooling water to the cooling unit and the cooling water passing through the cooling unit exchanges heat with the reduction agent supply unit, whereby an increase in the temperature of the reduction agent supply unit is suppressed. Moreover, in the exhaust gas processing device, since the apex portion of the first connection pipe is positioned on the upper side than the cooling unit, even when the cooling water boils in the cooling unit when the engine of the construction machine stops, the supplying portion positioned between the connection portion and the apex portion of the first connection pipe supplies cooling water to the cooling unit. Thus, it is possible to suppress an abrupt increase in the temperature of the reduction agent supply unit.

Moreover, it is preferable that the reduction agent supply unit includes: a reduction agent injector that supplies the reduction agent accommodated in the reduction agent tank into the exhaust gas processing unit; and a casing which holds the reduction agent injector and in which a cooling water passage is formed, and the cooling unit includes the cooling water passage.

According to the exhaust gas processing device, since the cooling water passage is formed in the casing of the reduction agent supply unit and the cooling water passage includes the cooling unit, it is possible to cool the reduction agent supply unit directly with the cooling water passing through the cooling unit when the engine of the construction machine is driven. As a result, it is possible to further suppress an increase in the temperature of the reduction agent supply unit.

Moreover, it is preferable that the supplying portion has a cooling water storage portion, and the cooling water storage portion has an inner cross-sectional area larger than an inner cross-sectional area of a region of the first connection pipe other than the cooling water storage portion.

According to the exhaust gas processing device, since the supplying portion has the cooling water storage portion, it is possible to secure a sufficient cooling water accommodation volume in the supplying portion without increasing the length of the supplying portion remarkably. As a result, it is possible to supply a sufficient amount of cooling water from the supplying portion to the cooling unit when the cooling water boils in the cooling unit when the engine of the construction machine stops.

Moreover, it is preferable that the supplying portion of the first connection pipe has a spiral form.

According to the exhaust gas processing device, since the supplying portion having a spiral shape has a large surface area, it is possible to enhance heat radiating properties of the supplying portion. Due to this, when the cooling water boils in the cooling unit when the engine of the construction machine stops, the cooling water is supplied from the supplying portion to the cooling unit, whereby gas having moved from the cooling unit to the supplying portion can be cooled efficiently. As a result, it is possible to allow the gas to become liquid more reliably. Moreover, although the supplying portion having the spiral shape has a large surface area, the supplying portion is disposed in a relatively narrow space as compared to a linear supplying portion having the same surface area as the spiral supplying portion.

Moreover, it is preferable that the first end portion of the cooling unit is positioned on an uppermost side of the cooling unit.

According to the exhaust gas processing device, when the cooling water boils in the cooling unit when the engine of the construction machine stops, cooling water can easily flow from the supplying portion into the cooling unit. As a result, it is possible to suppress an abrupt increase in the temperature of the reduction agent supply unit.

Moreover, a construction machine according to the present invention is a construction machine including the exhaust gas processing device according to the present invention and the engine, wherein the engine includes a cooling water supply path, and the cooling water accommodation unit of the exhaust gas processing device is an engine cooling water accommodation unit that supplies the cooling water to the cooling water supply path to cool the engine.

According to the construction machine, it is possible to cool the reduction agent supply unit using the engine cooling water accommodation unit that accommodates cooling water dedicated for cooling the engine. In this way, it is possible to reduce the number of components.

This application is based on Japanese Patent application No. 2014-011520 filed in Japan Patent Office on Jan. 24, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An exhaust gas processing device to be provided in a construction machine having an upper swinging body including a support frame extending both in a vertical direction and a horizontal direction, an engine provided on the support frame, the exhaust gas processing device adapted for processing exhaust gas of the engine, and comprising:
an exhaust gas processing unit that is mounted on the support frame and positioned above the engine and allows the exhaust gas of the engine to pass through the exhaust gas processing unit to process the exhaust gas;
a reduction agent tank that is mounted on the support frame and accommodates a reduction agent capable of reducing the exhaust gas;
a reduction agent supply unit that is attached to the exhaust gas processing unit to supply reduction agent from the reduction agent tank to the exhaust gas processing unit;
a cooling unit that has a first end portion and a second end portion positioned on an opposite side to the first end portion, the cooling unit allowing cooling water to pass through the cooling unit with the cooling water exchanging heat with the reduction agent supply unit to thereby cool the reduction agent supply unit, the first end portion being on an uppermost side of the cooling unit, the cooling unit including a cooling water passage, the cooling water passage having a first end connected to the first end portion of the cooling unit and having a second end connected to the second end portion of the cooling unit such that the cooling water passage extends straightly from the first end to the second end;
a cooling water accommodation unit that is mounted on the support frame and has a lower portion positioned below the cooling unit and accommodates cooling water to be supplied to the cooling unit;
a first connection pipe that connects the first end portion of the cooling unit and the cooling water accommodation unit;
a second connection pipe that connects the second end portion of the cooling unit and the cooling water accommodation unit;
a circulating device that is mounted on the support frame and driven by the engine so as to cause the cooling water to circulate through the first connection pipe and the second connection pipe such that the cooling water accommodated in the cooling water accommodation unit flows into the cooling unit through one of the first end portion and the second end portion of the cooling unit and flows out of the cooling unit through the other one of the first end portion and the second end portion of the cooling unit, wherein
the first connection pipe and the second connection pipe are connected to the lower portion of the cooling water accommodation unit, and
the first connection pipe includes:
a connection portion connected to the first end portion of the cooling unit;
an apex portion positioned on an uppermost side of the first connection pipe and above the cooling unit; and
a supplying portion that is positioned between the connection portion and the apex portion and accommodates a volume of cooling water to be supplied to the cooling unit in place of the cooling water boiled in the cooling unit having been heated by the exhaust gas after the engine is stopped.

2. The exhaust gas processing device according to claim 1, wherein
the reduction agent supply unit includes:
a reduction agent injector that supplies the reduction agent from the reduction agent tank to the exhaust gas processing unit; and
a casing which holds the reduction agent injector;
wherein the cooling water passage is formed in the casing of the reduction agent supply unit.

3. The exhaust gas processing device according to claim 2,
the supplying portion has a cooling water storage portion, and the cooling water storage portion has an inner cross-sectional area larger than an inner cross-sectional area of a region of the first connection pipe other than the cooling water storage portion.

4. The exhaust gas processing device according to claim 3, wherein
the supplying portion has a spiral form.

5. The exhaust gas processing device according to claim 1, wherein
the supplying portion has a cooling water storage portion, and
the cooling water storage portion has an inner cross-sectional area larger than an inner cross-sectional area of a region of the first connection pipe other than the cooling water storage portion.

6. The exhaust gas processing device according to claim 1, wherein the supplying portion has a spiral form.

7. A construction machine comprising:
the exhaust gas processing device according to claim 1; and
the engine, wherein
the engine includes a cooling water supply path, and
the cooling water accommodation unit of the exhaust gas processing device is an engine cooling water accommodation unit that supplies the cooling water to the cooling water supply path to cool the engine.

8. The construction machine according to claim 7, wherein
the reduction agent supply unit includes:
a reduction agent injector that supplies the reduction agent from the reduction agent tank to the exhaust gas processing unit; and
a casing a which holds the reduction agent injector;
wherein the cooling water passage is formed in the casing of the reduction agent supply unit.

9. The construction machine according to claim 8, wherein
the supplying portion has a cooling water storage portion, and
the cooling water storage portion has an inner cross-sectional area larger than an inner cross-sectional area of a region of the first connection pipe other than the cooling water storage portion.

10. The construction machine according to claim 9, wherein
the supplying portion has a spiral form.

11. The construction machine according to claim 7, wherein
the reduction agent supply unit includes:
a reduction agent injector that supplies the reduction agent from the reduction agent tank to the exhaust gas processing unit; and
a casing which holds the reduction agent injector;
wherein the cooling water passage is a cooling pipe made in contact with the casing of the reduction agent supply unit.

12. The construction machine according to claim 11,
the supplying portion has a cooling water storage portion, and
the cooling water storage portion has an inner cross-sectional area larger than an inner cross-sectional area of a region of the first connection pipe other than the cooling water storage portion.

13. The construction machine according to claim 12, wherein
the supplying portion has a spiral form.

14. The exhaust gas processing device according to claim 1, wherein
the reduction agent supply unit includes:
a reduction agent injector that supplies the reduction agent from the reduction agent tank to the exhaust gas processing unit; and
a casing which holds the reduction agent injector;
wherein the cooling water passage is a cooling pipe made in contact with the casing of the reduction agent supply unit.

15. The exhaust gas processing device according to claim 14,
the supplying portion has a cooling water storage portion, and
the cooling water storage portion has an inner cross-sectional area larger than an inner cross-sectional area of a region of the first connection pipe other than the cooling water storage portion.

16. The exhaust gas processing device according to claim 15, wherein
the supplying portion has a spiral form.

* * * * *